(12) United States Patent
Ju et al.

(10) Patent No.: US 9,982,103 B2
(45) Date of Patent: May 29, 2018

(54) POLYIMIDE AND POLYIMIDE FILM COMPRISING THE SAME

(71) Applicant: KOLON INDUSTRIES, INC., Gwacheon-si, Gyeonggi-do (KR)

(72) Inventors: Chul Ha Ju, Yongin-si (KR); Hyo Jun Park, Yongin-si (KR); Hak Gee Jung, Yongin-si (KR)

(73) Assignee: KOLON INDUSTRIES, INC., Gwacheon-si (KR)

(*) Notice: Subject to any disclaimer, the term of this patent is extended or adjusted under 35 U.S.C. 154(b) by 380 days.

(21) Appl. No.: 14/411,151

(22) PCT Filed: Jun. 27, 2013

(86) PCT No.: PCT/KR2013/005685
§ 371 (c)(1),
(2) Date: Dec. 24, 2014

(87) PCT Pub. No.: WO2014/003451
PCT Pub. Date: Jan. 3, 2014

(65) Prior Publication Data
US 2015/0152232 A1    Jun. 4, 2015

(30) Foreign Application Priority Data

Jun. 29, 2012  (KR) .................. 10-2012-0070549

(51) Int. Cl.
| | | |
|---|---|---|
| *C08J 5/18* | (2006.01) | |
| *C08K 3/36* | (2006.01) | |
| *C09D 179/08* | (2006.01) | |
| *C08G 73/10* | (2006.01) | |

(52) U.S. Cl.
CPC ............ *C08J 5/18* (2013.01); *C08G 73/1003* (2013.01); *C08K 3/36* (2013.01); *C09D 179/08* (2013.01); *C08J 2379/08* (2013.01)

(58) Field of Classification Search
CPC ... C08G 5/18; C08G 18/3846; C08G 18/6266
See application file for complete search history.

(56) References Cited

U.S. PATENT DOCUMENTS

| | | | | |
|---|---|---|---|---|
| 3,832,322 A | * | 8/1974 | Critchley | ........... C08G 73/1039 524/409 |
| 5,688,841 A | | 11/1997 | Parish | |
| 2009/0078453 A1 | * | 3/2009 | Jung | ................. C08G 73/1042 174/254 |

FOREIGN PATENT DOCUMENTS

| | | |
|---|---|---|
| CN | 102086303 A | 6/2011 |
| JP | 08-104749 A | 4/1996 |
| JP | 2005-325329 A | 11/2005 |

(Continued)

OTHER PUBLICATIONS

L. T. Zhuravlev, "Concentration of Hydroxyl Groups on the Surface of Amorphous Silicas", American Chemical Society, Langmuir, 1987, vol. 3, pp. 316-318.

(Continued)

*Primary Examiner* — Ling Siu Choi
*Assistant Examiner* — Thuy-Ai N Nguyen
(74) *Attorney, Agent, or Firm* — Sughrue Mion, PLLC (57) ABSTRACT

This invention relates to polyimide, which includes amorphous silica particles having OH groups thereon and is thus highly heat-resistant, colorless and transparent, and to a polyimide film manufactured using the polyimide.

9 Claims, 3 Drawing Sheets

(56) References Cited

FOREIGN PATENT DOCUMENTS

| JP | 2008-88372 A | 4/2008 | | |
|---|---|---|---|---|
| JP | 200888371 A | 4/2008 | | |
| JP | 2008088371 | * | 4/2008 | ............. C08L 79/08 |
| KR | 10-2009-0019306 A | 2/2009 | | |
| WO | 2012050072 A1 | 4/2012 | | |

OTHER PUBLICATIONS

International Searching Authority, International Search Report for PCT/KR2013/005685 dated Sep. 27, 2013.
State Intellectual Property Office of the P.R.C.; Communication dated Jul. 19, 2016 in counterpart application No. 201380034887.X.
"Preparation of Aromatic Polyimide-Amide", Polymer Letters, 1965, vol. 3, XP-002074240, pp. 679-683.
European Patent Office; Communication dated Feb. 1, 2016 in counterpart European application No. 13810502.8.

\* cited by examiner

POLYIMIDE AND POLYIMIDE FILM COMPRISING THE SAME

CROSS REFERENCE TO RELATED APPLICATIONS

This application is a National Stage of International Application No. PCT/KR2013/005685 filed Jun. 27, 2013, claiming priority based on Korean Patent Application No. 10-2012-0070549 filed Jun. 29, 2012, the contents of all of which are incorporated herein by reference in their entirety.

TECHNICAL FIELD

The present invention relates to polyimide, which contains amorphous silica particles having OH groups thereon and exhibits high heat resistance, colorlessness and transparency, and to a polyimide film.

BACKGROUND ART

Typically, a polyimide (PI) film is formed from polyimide, and polyimide refers to a highly heat-resistant resin prepared by subjecting an aromatic dianhydride and an aromatic diamine or an aromatic diisocyanate to solution polymerization, thus preparing a polyamic acid derivative, which is then subjected to ring-closing reaction and dehydration at high temperature so as to be imidized.

Useful in the preparation of such polyimide, the aromatic dianhydride may include pyromellitic dianhydride (PMDA), biphenyltetracarboxylic dianhydride (BPDA), etc., and the aromatic diamine may include oxydianiline (ODA), p-phenylenediamine (p-PDA), m-phenylenediamine (m-PDA), methylenedianiline (MDA), bis aminophenyl hexafluoropropane (HFDA), etc.

Polyimide is a very highly heat-resistant resin which is nonsoluble and nonfusible, and is superior in terms of thermal oxidation resistance, heat resistance, radiation resistance, low-temperature characteristics, chemical resistance, etc., and has thus been utilized in a variety of fields including advanced heat-resistant materials, such as automotive materials, aircraft materials, spacecraft materials, etc., and electronic materials such as insulation coating materials, insulating films, semiconductors, electrode protecting films for TFT-LCDs, etc.

However, polyimide is brown- or yellow-colored due to its high aromatic ring density, and thus has low transmittance in the visible light range, making it difficult to apply polyimide to fields requiring transparency.

Hence, attempts have been made to impart transparency to polyimide which typically shows a deep brown or yellow color. For example, a linkage group (—O—, —SO$_2$—, —CO—, —CF$_3$CCF$_3$—, etc.) or a side chain having a comparatively large free volume is introduced to a main chain, so that an intermolecular or intramolecular charge transfer complex is minimized to achieve transparency.

In the case of such a transparent polyimide film, the color based on the charge transfer complex fades away but heat resistance may be decreased due to the functional group introduced as above. Accordingly, polyimide having low heat resistance is difficult to apply to advanced material fields such as displays or semiconductors requiring high process temperatures.

Conventional polyimide, which has a high coefficient of thermal expansion, may easily incur warpage or entanglement when being used in advanced material fields such as displays or semiconductors and in optical coating films. Hence, a polyimide film is required to have a low coefficient of thermal expansion.

A filler, which is responsible for a variety of functions in the film, is used to increase traveling performance upon production of the film, or to enhance optical properties or heat resistance as needed.

The filler may be physically dispersed using a mill, a mixer, a high-speed stirrer-homogenizer, an ultrasonic processor, etc., and also, may be dispersed after surface treatment to prevent agglomeration of the dispersed filler and to increase miscibility.

DISCLOSURE

Technical Problem

Accordingly, the present invention is intended to provide polyimide, which is highly heat-resistant, colorless and transparent.

Also, the present invention is intended to provide a polyimide film, which is made of the above polyimide and is highly heat-resistant, colorless and transparent.

Also, the present invention is intended to provide a substrate for a display, which has improved heat resistance.

Technical Solution

According to a preferred first embodiment of the present invention, polyimide is provided, which includes amorphous silica particles having OH groups thereon.

In the above embodiment, the amorphous silica particles having OH groups thereon may be used in an amount of 0.01~0.1 parts by weight based on 100 parts by weight of the polyimide.

In the above embodiment, the amorphous silica particles having OH groups thereon, which are dispersed in a concentration of 0.01~1.0 wt % in a solvent, may be added to a polyimide preparation process.

In the above embodiment, the polyimide may be prepared by copolymerizing a dianhydride, an aromatic dicarbonyl compound and a diamine.

According to a preferred second embodiment of the present invention, a polyimide film is provided, which includes the polyimide as above.

The polyimide film may have a haze of 2.0 or less.

The polyimide film may have an optical transmittance of 88% or more at a wavelength of 550 nm.

The polyimide film may have a coefficient of thermal expansion (CTE) of 15 ppm/° C. or less at 50~250° C., and a yellow index of 7 or less.

The polyimide film may be obtained by polymerizing a dianhydride, an aromatic dicarbonyl compound and a diamine in a first solvent to prepare a polyamic acid solution, imidizing the polyamic acid solution to prepare an imidized solution, which is then added to a second solvent, filtered and dried to obtain a polyimide resin solid, mixing the polyimide resin solid with amorphous silica particles having OH groups thereon dispersed in a first solvent to prepare a mixture, and then subjecting the mixture to a film forming process.

The first solvent may be at least one selected from among m-cresol, N-methyl-2-pyrrolidone (NMP), dimethylformamide (DMF), dimethylacetamide (DMAc), dimethylsulfoxide (DMSO), acetone and diethylacetate, and the second solvent may be at least one selected from among water, alcohols, ethers and ketones.

The polyimide film may be obtained by performing additional thermal treatment at 300~500° C. for 1 min~3 hr, after the film forming process.

According to a preferred third embodiment of the present invention, a substrate for a display is provided, which includes the polyimide film as above.

Advantageous Effects

According to the present invention, a polyimide film, which is colorless and transparent and exhibits high heat resistance, can be provided.

DESCRIPTION OF DRAWINGS

The above and other objects, features and advantages of the present invention will be more clearly understood from the following detailed description taken in conjunction with the accompanying drawings, in which.

BEST MODE

Unless otherwise defined, all technical and scientific terms used herein have the same meaning as those which are commonly understood by those skilled in the art to which this invention belongs. Generally, the nomenclature used herein is well known in the art and is the nomenclature normally used.

As used herein, when any part "includes" or "contains" any element, this indicates that other elements are not excluded but may be further included unless otherwise specifically mentioned.

Hereinafter, a detailed description will be given of the present invention.

An embodiment of the present invention pertains to polyimide, which includes amorphous silica particles having OH groups thereon.

Another embodiment of the present invention pertains to a polyimide film, which includes the above polyimide.

Figure 1:
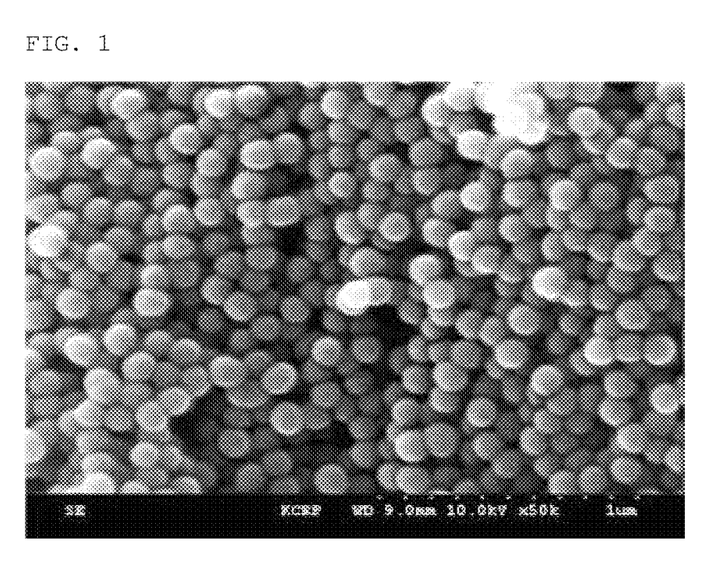
FIG. 1 is a scanning electron microscope (SEM) image illustrating typical silica particles at 50,000 magnifications.
Figure 2:
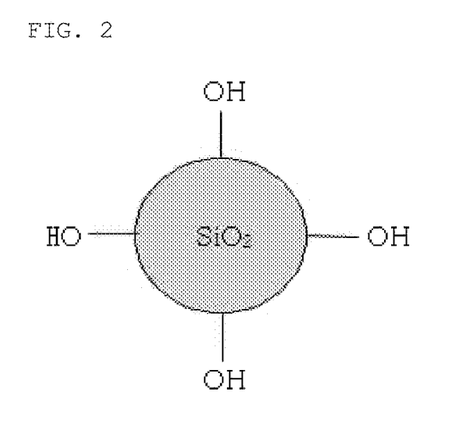
FIG. 2 illustrates a chemical formula of silica having OH groups thereon.
Figure 3:
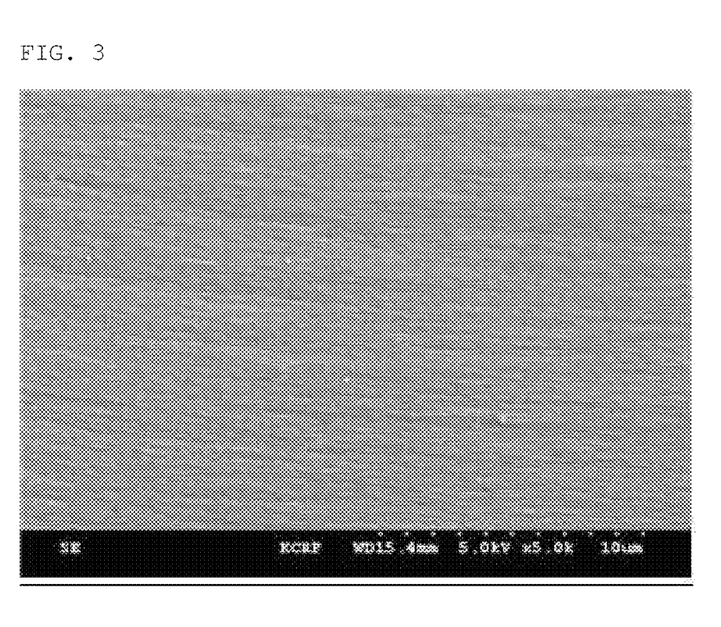
FIG. 3 is an SEM image illustrating a polyimide film of Example 1 according to the present invention at 5,000 magnifications.

Conventionally, a silica filler is used to improve traveling performance upon production of a polyimide film, or to enhance heat resistance. However, even when silica having a very high ability to agglomerate is dispersed in a polyimide resin using ultrasound or various kinds of mill, it may reagglomerate (FIG. 1). Hence, in the present invention, as illustrated in FIG. 2, amorphous silica particles configured such that hydroxyl (—OH) groups are linked to the surfaces of silica particles are used, thereby increasing free volume of the surface of the filler and preventing agglomeration of the silica particles by virtue of repulsive force therebetween, ultimately improving miscibility with a polyimide resin and dispersibility.

Also, compared to when using crystalline silica having a regular array, amorphous silica particles are used in the present invention to maintain optical transparency of the polyimide, so that the resulting polyimide film may have lower thermal conductivity and coefficient of thermal expansion, and may also have smaller amounts of moisture and impurities, thereby exhibiting superior optical characteristics.

The amorphous silica particles having OH groups may be used in an amount of 0.01~0.1 parts by weight based on 100 parts by weight of polyimide. If the amount of the silica particles is less than 0.01 parts by weight based on 100 parts by weight of polyimide, it is impossible to improve heat resistance and traveling performance upon production of a film. In contrast, if the amount thereof exceeds 0.1 parts by weight, optical characteristics may deteriorate due to the agglomeration of the silica particles.

According to the present invention, the amorphous silica particles having OH groups thereon may be obtained by thermally treating natural silica at high temperature, cooling the thermally treated silica to room temperature, removing impurities therefrom and performing surface treatment via ion exchange. As such, the thermal treatment temperature of crystalline silica is set to 800~1,000° C. If this temperature is lower than 800° C., organic materials and moisture may be undesirably left behind. In contrast, if this temperature is higher than 1,000° C., silica may undesirably decompose.

Also, impurities may be removed at 100~120° C. using an acid, such as hydrochloric acid, etc., and ion exchange may be performed using an ion exchange agent able to supply a hydroxide ion, such as sodium hydroxide, calcium hydroxide, etc., thereby preparing amorphous silica having OH groups thereon.

The particle size of the amorphous silica particles having OH groups thereon may be adjusted depending on the characteristics of a polyimide film to be manufactured, and is not particularly limited, but the average particle size of the amorphous silica particles having OH groups thereon is set to 0.001~50 μm, preferably 0.005~25 μm, and more preferably 0.01~10 μm. In this case, it is easy to manifest the transparency of the polyimide film, heat resistance and mechanical properties may be enhanced, and also surface characteristics may be improved, making it possible to ameliorate characteristics such as frictional coefficient, electrical conductivity, etc.

The amorphous silica particles having OH groups thereon, which are dispersed in a solvent, may be added to a polyimide preparation process. If the concentration of the silica particles dispersed in the solvent is less than 0.01 wt %, solid content is low, making it difficult to manufacture a film. In contrast, if the concentration thereof exceeds 1.0 wt %, the color of the dispersed solution may become opaque, undesirably deteriorating optical characteristics of the formed film.

The solvent in which the amorphous silica particles having OH groups thereon may be dispersed may be a first solvent used in polymerization of polyamic acid, as will be described later, in terms of workability and cost. An example thereof may include at least one polar solvent selected from among m-cresol, N-methyl-2-pyrrolidone (NMP), dimethylformamide (DMF), dimethylacetamide (DMAc), dimethylsulfoxide (DMSO), acetone and diethylacetate. In addition, a low boiling point solution such as tetrahydrofuran (THF) or chloroform or a low absorbable solvent such as γ-butyrolactone may be utilized.

According to the present invention, polyimide may be prepared by copolymerizing a dianhydride, an aromatic dicarbonyl compound and a diamine, thus obtaining a polyamic acid solution, which is then partially imidized, added to a second solvent, precipitated, filtered and dried, thus preparing a polyimide solid, mixing the polyimide solid with amorphous silica particles having OH groups thereon dispersed in a solvent, and imidizing the mixture.

Also, according to the present invention, a polyimide film may be manufactured by applying the polyimide prepared as above on a stainless plate, and performing casting, imidization and final thermal treatment.

In the present invention, examples of the dianhydride, which is used to minimize an intermolecular or intramolecular charge transfer complex so as to achieve transparency and to improve heat resistance, may include, but are not limited to, 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic dianhydride (TDA), pyromellitic dianhydride (1,2,4,5-benzene tetracarboxylic dianhydride, PMDA), benzophenone tetracarboxylic dianhydride (BTDA), biphenyltetracarboxylic dianhydride (BPDA), bis carboxyphenyl dimethyl silane dianhydride (SiDA), oxydiphthalic dianhydride (ODPA), bis dicarboxyphenoxy diphenyl sulfide dianhydride (BDSDA), sulfonyl diphthalic anhydride (SO2DPA), cyclobutane tetracarboxylic dianhydride (CBDA), isopropylidenediphenoxy bis phthalic anhydride (6HDBA), etc., which may be used alone or in mixtures of two or more.

In the present invention, examples of the aromatic dicarbonyl compound, which is used to ensure heat resistance and mechanical properties, may include p-terephthaloyl chloride (TPC), terephthalic acid, iso-phthaloyl dichloride and 4,4'-benzoyl chloride, which may be used alone or in mixtures of two or more.

In the present invention, examples of the diamine, which is used to minimize an intermolecular or intramolecular charge transfer complexes so as to achieve transparency and to improve heat resistance, may include, but are not limited to, oxydianiline (ODA), p-phenylenediamine (pPDA), m-phenylenediamine (mPDA), p-methylenediamine (pMDA), m-methylenediamine (mMDA), bis trifluoromethyl benzidine (TFDB), cyclohexanediamine (13CHD, 14CHD), bis aminohydroxy phenyl hexafluoropropane (DBOH), bis aminophenoxy benzene (133APB, 134APB, 144APB), bis aminophenyl hexafluoropropane (33~6F, 44~6F), bis aminophenyl sulfone (ODDS, 3DDS), bis aminophenoxy phenyl hexafluoropropane (4BDAF), bis aminophenoxy phenyl propane (6HMDA), bis aminophenoxy diphenyl sulfone (DBSDA), etc., which may be used alone or in mixtures of two or more.

The molar amount of dianhydride and aromatic dicarbonyl compound is preferably set to be equal to the molar amount of diamine, and these are dissolved in the first solvent and polymerized, thus preparing a polyamic acid solution. Although the polymerization conditions are not particularly limited, it is preferred that the reaction temperature be set to −20~80° C. and the reaction time be set to 2~48 hr. Upon reaction, an inert atmosphere such as argon or nitrogen may be applied.

According to the present invention, the polyimide is colorless and transparent and thus may have improved heat resistance, by the use of the dianhydride, the aromatic dicarbonyl compound, and the diamine.

The first solvent for the solution polymerization of the above monomer components includes any solvent without particular limitation so long as polyamic acid is dissolved therein. As a known reaction solvent, useful is at least one polar solvent selected from among m-cresol, N-methyl-2-pyrrolidone (NMP), dimethylformamide (DMF), dimethylacetamide (DMAc), dimethylsulfoxide (DMSO), acetone and diethylacetate. In addition, a low boiling point solution, such as tetrahydrofuran (THF) or chloroform, or a low absorbable solvent, such as γ-butyrolactone, may be utilized.

Upon preparation of the polyamic acid solution, the amount of the first solvent is not particularly limited, and is preferably set to 50~95 wt %, and more preferably 70~90 wt %, based on the total amount of the polyamic acid solution, in order to attain appropriate molecular weight and viscosity of the polyamic acid solution.

In addition to the amorphous silica particles having OH groups thereon, a filler may be further added to the polyamic acid solution so as to improve a variety of characteristics of the polyimide film, including sliding performance, thermal conductivity, electrical conductivity, corona resistance, etc.

The kind of filler is not particularly limited, and specific examples thereof may include titanium oxide, layered silica, carbon nanotubes, alumina, silicon nitride, boron nitride, calcium hydrogen phosphate, calcium phosphate, mica, etc.

The particle size of the filler may vary depending on the characteristics of a film to be modified and the kind of added filler, and is not particularly limited. The average particle size thereof is set to 0.001~50 μm, preferably 0.005~25 μm, and more preferably 0.01~10 μm. In this case, it is easy to manifest the effective modification of the transparent polyimide film, heat resistance and mechanical properties may be enhanced, and also surface characteristics may be improved, making it possible to ameliorate characteristics such as frictional coefficient, electrical conductivity, etc.

In order to exhibit characteristics to be modified without disturbing the bonding structure of the polymer resin, the amount of the filler is set to 0.001~20 parts by weight, and preferably 0.01~1 parts by weight, based on 100 parts by weight of the polyamic acid solution.

Upon dispersion of the filler, the concentration of the filler is set to 0.001~1 wt %, and preferably 0.01~1 wt %, based on the total weight of the solvent. If the concentration of the dispersed filler exceeds 1 wt %, the color of the dispersed solution may become opaque, undesirably deteriorating optical characteristics of the formed film. In contrast, if the concentration thereof is less than 0.01 wt %, solid content may be low, making it difficult to improve heat resistance and mechanical properties and to manufacture a film.

The filler may be physically dispersed using a mill, a mixer, a high-speed stirrer-homogenizer, an ultrasonic processor, etc., and also, may be dispersed after surface treatment to prevent agglomeration of the dispersed filler and to increase miscibility.

In the present invention, in order to uniformly disperse the filler and to prevent agglomeration of the dispersed filler, the filler is mixed with a solvent, physically dispersed using an ultrasonic processor, and then treated using a high-speed stirrer.

A process of adding the filler is not particularly limited, and includes, for example, adding the filler to the polyamic acid solution before or after polymerization, kneading the filler using a 3 roll mill, a high-speed stirrer, a rotary mixer, etc. after completion of the polymerization of polyamic acid, or mixing a dispersion solution containing the filler with the polyamic acid solution.

The polyamic acid solution prepared as above is partially imidized, added to the second solvent, precipitated, filtered and dried, thus obtaining the polyimide solid.

Partial imidization of the polyamic acid solution may be carried out using thermal imidization, chemical imidization, or a combination of thermal imidization and chemical imidization. Specifically, chemical imidization is performed by adding the polyamic acid solution with a dehydrating agent including an acid anhydride such as acetic anhydride, etc., and an imidization catalyst including a tertiary amine such as isoquinoline, β-picoline, pyridine, etc. In the case where thermal imidization or a combination of thermal imidization and chemical imidization is applied, heating conditions of the polyamic acid solution may vary depending on the kind of polyamic acid solution, the thickness of the resulting polyimide film, etc.

When specifically describing the combination of thermal imidization and chemical imidization, the polyamic acid solution is added with a dehydrating agent and an imidization catalyst, and heated at 20~180° C. and preferably 50~150° C. to activate the dehydrating agent and the imidization catalyst, yielding the polyimide solid.

The second solvent may have lower polarity than the first solvent in order to obtain the polyimide resin solid. Specifically, the second solvent may be at least one selected from among water, alcohols, ethers and ketones. The amount of the second solvent is not particularly limited, and is preferably 5~20 times the weight of the polyamic acid solution. The conditions for drying the filtered polyimide solid may include a temperature of 50~120° C. and a time period of 3~24 hr, taking into consideration the boiling point of the second solvent.

The polyimide resin solid thus obtained is mixed with the amorphous silica particles having OH groups thereon uniformly dispersed in the first solvent, and then imidized, resulting in polyimide or a polyimide film.

Also in this case, imidization may be conducted using thermal imidization, chemical imidization, or a combination of thermal imidization and chemical imidization. Particularly, the polyimide film may be obtained in such a manner that the polyimide is cast on a support, heated at 80~200° C. and preferably 100~180° C. so as to be cured and dried, and the resulting gel film is stripped from the support, fixing on frame, and heated at 40~400° C. for 1 min-8 hr.

The gel film may be fixed on the frame using a pin or a clip. The support may be exemplified by a glass plate, an aluminum foil, a circulating stainless belt, a stainless drum, etc.

Also, in the present invention, the polyimide film obtained as above may be further thermally treated. The additional thermal treatment is preferably performed at 300~500° C. for 1 min~3 hr. The residual volatile content of the thermally treated film may be 5% or less, and preferably 3% or less.

When thermal treatment is performed once more on the polyimide film in this way, heat and residual stress may be removed from the film, thus ensuring thermal stability.

In the present invention, the polyimide film is manufactured by mixing the amorphous silica particles having OH groups thereon dispersed in the first solvent with the refined polyimide solid. As such, the amorphous silica particles may be uniformly dispersed in the polyimide without reagglomeration, ultimately lowering the coefficient of thermal expansion of the polyimide film and ameliorating optical characteristics thereof.

A further embodiment of the present invention pertains to a substrate for a display, including the polyimide film as above.

According to the present invention, the thickness of the polyimide film is not particularly limited, and is preferably set to 10~250 µm, and more preferably 25~150 µm.

Moreover, the polyimide film according to the present invention has a haze of 2.0 or less, an optical transmittance of 88% or more at a wavelength of 550 nm, a coefficient of thermal expansion of 15 ppm/° C. or less at 50~250° C., and a yellow index of 7 or less, and is thus transparent and has improved heat resistance, whereby such a polyimide film may be utilized in a variety of fields including substrates for displays, etc.

A better understanding of the present invention may be obtained by the following examples which are set forth to illustrate, but are not to be construed as limiting the present invention.

Preparation Example 1

100 g of natural amorphous silica particles (SEAHOSTAR, available from NIPPON SHOKUBAI) were thermally treated at 800° C. for 2 hr, and cooled to room temperature. 400 g of hydrochloric acid and 60 g of the thermally treated amorphous silica particles were placed in a 0.5 L reactor with a Teflon stirrer, a nitrogen injector, a temperature controller and a condenser, after which the temperature of the reactor was adjusted to 105° C., and the mixture in the reactor was refluxed with stirring for 1 hr. Thereafter, the amorphous silica particles were filtered, washed with distilled water, and dried in a vacuum oven at 80° C. for 12 hr to give 54 g of amorphous silica particles. 50 g of the dried amorphous silica particles and 150 ml of an aqueous sodium hydroxide solution (10 wt %) were placed in a reactor, refluxed with stirring at 100° C. for 3 hr, cooled to room temperature, washed with distilled water, and dried in a vacuum oven at 80° C. for 12 hr, thereby preparing 44 g of amorphous silica particles having OH groups thereon (average particle size: 0.1 µm).

Example 1

1-1: Preparation of Polyimide Solid

While passing nitrogen through a 1 L reactor with a stirrer, a nitrogen injector, a dropping funnel, a temperature controller and a condenser, 821 g of N,N-dimethylacetamide (DMAc) was placed in the reactor, and the temperature of the reactor was adjusted to 25° C., 64.046 g (0.2 mol) of TFDB was dissolved, and the resulting solution was maintained at 25° C. 26.655 g (0.06 mol) of 6FDA and 11.769 g (0.04 mol) of BPDA were added, and stirred for 1 hr, and thus dissolved and reacted. As such, the temperature of the solution was maintained at 25° C. Further, 20.302 g (0.1 mol) of TPC was added, and the resulting mixture was stirred for 12 hr, thus obtaining a polyamic acid solution having a solid content of 13 wt %.

The polyamic acid solution was added with 13 g of pyridine and 17 g of acetic anhydride, stirred for 30 min, further stirred at 70° C. for 1 hr, cooled to room temperature, and precipitated with 20 L of methanol. The precipitated solid was filtered, ground, and dried at 100° C. in a vacuum for 6 hr, yielding 100 g of a polyimide solid in powder form.

1-2: Manufacture of Polyimide Film 0.03 g of the amorphous silica particles having OH groups thereon prepared in Preparation Example 1 were added to 30 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). While passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 639 g of N,N-dimethylacetamide (DMAc) in the reactor, and stirred and thus dissolved.

The dissolved mixture (solid content of 13 wt %) was applied on a stainless plate, cast to a thickness of 400 µm, and dried using hot air at 130° C. for 30 min, after which the resulting film was stripped from the stainless plate and then fixed on a frame using a pin. The frame having the film fixed thereon was placed in a vacuum oven, slowly heated from 100° C. to 300° C. for 2 hr, gradually cooled, and separated from the frame, thereby obtaining a polyimide film. Further, final thermal treatment was then conducted at 300° C. for 30 min (thickness 67 μm).

Example 2

A polyimide film was manufactured in the same manner as in Example 1. Specifically, 0.05 g of the amorphous silica particles having OH groups thereon prepared in Preparation Example 1 were added to 50 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 639 g of N,N-dimethylacetamide (DMAc) in the reactor and stirred, and the dissolved mixture (solid content of 13 wt %) was then treated as in Example 1, thereby manufacturing a polyimide film (thickness 67 μm).

Example 3

A polyimide film was manufactured in the same manner as in Example 1. Specifically, 0.07 g of the amorphous silica particles having OH groups thereon prepared in Preparation Example 1 were added to 70 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 599 g of N,N-dimethylacetamide (DMAc) in the reactor and stirred, and the dissolved mixture (solid content of 13 wt %) was then treated as in Example 1, thereby manufacturing a polyimide film (thickness 65 μm).

Example 4

A polyimide film was manufactured in the same manner as in Example 1. Specifically, 0.1 g of the amorphous silica particles having OH groups thereon prepared in Preparation Example 1 were added to 100 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 569 g of N,N-dimethylacetamide (DMAc) in the reactor and stirred, and the dissolved mixture (solid content of 13 wt %) was then treated as in Example 1, thereby manufacturing a polyimide film (thickness 65 μm).

Example 5

A polyimide film was manufactured in the same manner as in Example 1. Specifically, 0.03 g of the amorphous silica particles having OH groups thereon prepared in Preparation Example 1 were added to 3 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 1.0 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 666 g of N,N-dimethylacetamide (DMAc) in the reactor and stirred, and the dissolved mixture (solid content of 13 wt %) was then treated as in Example 1, thereby manufacturing a polyimide film (thickness 65 μm).

Example 6

A polyimide film was manufactured in the same manner as in Example 1. Specifically, 0.05 g of the amorphous silica particles having OH groups thereon prepared in Preparation Example 1 were added to 5 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 1.0 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 664 g of N,N-dimethylacetamide (DMAc) in the reactor and stirred, and the dissolved mixture (solid content of 13 wt %) was then treated as in Example 1, thereby manufacturing a polyimide film (thickness 63 μm).

Example 7

A polyimide film was manufactured in the same manner as in Example 1. Specifically, 0.07 g of the amorphous silica particles having OH groups thereon prepared in Preparation Example 1 were added to 7 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 1.0 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 662 g of N,N-dimethylacetamide (DMAc) in the reactor and stirred, and the dissolved mixture (solid content of 13 wt %) was then treated as in Example 1, thereby manufacturing a polyimide film (thickness 63 μm).

Example 8

A polyimide film was manufactured in the same manner as in Example 1. Specifically, 0.1 g of the amorphous silica particles having OH groups thereon prepared in Preparation Example 1 were added to 10 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 1.0 wt %). Thereafter, while passing nitrogen through a 1 L reactor with a stirrer, a nitrogen injector, a dropping funnel, a temperature controller and a condenser, the dispersion solution of amorphous silica particles and 100 g of the polyimide solid of Example 1-1 were added to 659 g of N,N-dimethylacetamide (DMAc) in the reactor and stirred, and the dissolved mixture (solid content of 13 wt %) was then treated as in Example 1, thereby manufacturing a polyimide film (thickness 63 μm).

Comparative Example 1

1-1: Preparation of Polyimide

While passing nitrogen through a 1 L reactor with a stirrer, a nitrogen injector, a dropping funnel, a temperature controller and a condenser, 821 g of N,N-dimethylacetamide (DMAc) was placed in the reactor, and the temperature of the reactor was adjusted to 25° C., 64.046 g (0.2 mol) of TFDB was dissolved, and the resulting solution was maintained at 25° C. 26.655 g (0.06 mol) of 6FDA and 11.769 g (0.04 mol) of BPDA were added, and stirred for 1 hr, and thus dissolved and reacted. As such, the temperature of the solution was maintained at 25° C. Further, 20.302 g (0.1 mol) of TPC was added, and the resulting mixture was stirred for 12 hr, thus obtaining a polyamic acid solution having a solid content of 13 wt %.

The polyamic acid solution was added with 13 g of pyridine and 17 g of acetic anhydride, stirred for 30 min, further stirred at 70° C. for 1 hr, cooled to room temperature, and precipitated with 20 L of methanol. The precipitated solid was filtered, ground, and dried at 100° C. in a vacuum for 6 hr, yielding 100 g of a polyimide solid in powder form.

1-2: Manufacture of Polyimide Film

While passing nitrogen through a 1 L reactor with a stirrer, a nitrogen injector, a dropping funnel, a temperature controller and a condenser, 670 g of N,N-dimethylacetamide (DMAc) was placed in the reactor, and 100 g of the polyimide solid obtained in Comparative Example 1-1 was dissolved, thus obtaining a solution having a solid content of 13 wt %. The subsequent procedures were carried out in the same manner as in Example 1, thereby manufacturing a polyimide film (thickness 65 μm).

Comparative Example 2

2-1: Preparation of Polyimide

While passing nitrogen through a 1 L reactor with a stirrer, a nitrogen injector, a dropping funnel, a temperature controller and a condenser, 821 g of N,N-dimethylacetamide (DMAc) was placed in the reactor, and the temperature of the reactor was adjusted to 25° C., 64.046 g (0.2 mol) of TFDB was dissolved, and the resulting solution was maintained at 25° C. 26.655 g (0.06 mol) of 6FDA and 11.769 g (0.04 mol) of BPDA were added, and stirred for 1 hr, and thus dissolved and reacted. As such, the temperature of the solution was maintained at 25° C. Further, 20.302 g (0.1 mol) of TPC was added, and the resulting mixture was stirred for 12 hr, thus obtaining a polyamic acid solution having a solid content of 13 wt %.

The polyamic acid solution was added with 13 g of pyridine and 17 g of acetic anhydride, stirred for 30 min, further stirred at 70° C. for 1 hr, cooled to room temperature, and precipitated with 20 L of methanol. The precipitated solid was filtered, ground, and dried at 100° C. in a vacuum for 6 hr, yielding 100 g of a polyimide solid in powder form.

2-2: Manufacture of Polyimide Film

A polyimide film was manufactured in the same manner as in Example 1. Specifically, 0.03 g of natural amorphous silica particles having no OH group (SEAHOSTAR, available from NIPPON SHOKUBAI) were added to 30 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). While passing nitrogen through a 1 L reactor with a stirrer, a nitrogen injector, a dropping funnel, a temperature controller and a condenser, the dispersion solution of silica particles and 100 g of the polyimide solid of Comparative Example 2-1 were added to 639 g of N,N-dimethylacetamide (DMAc) in the reactor and stirred, and the dissolved mixture (solid content of 13 wt %) was then treated as in Example 1, thereby manufacturing a polyimide film (thickness 55 μm).

Comparative Example 3

A polyimide film was manufactured in the same manner as in Example 1. Specifically, 0.05 g of natural amorphous silica particles having no OH group (SEAHOSTAR, available from NIPPON SHOKUBAI) were added to 50 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). Thereafter, while passing nitrogen through a 1 L reactor with a stirrer, a nitrogen injector, a dropping funnel, a temperature controller and a condenser, the dispersion solution of silica particles and 100 g of the polyimide solid of Comparative Example 2-1 were added to 619 g of N,N-dimethylacetamide (DMAc) in the reactor and stirred, and the dissolved mixture (solid content of 13 wt %) was then treated as in Example 1, thereby manufacturing a polyimide film (thickness 65 μm).

Comparative Example 4

A polyimide film was manufactured in the same manner as in Example 1. Specifically, 0.1 g of natural amorphous silica particles having no OH group (SEAHOSTAR, available from NIPPON SHOKUBAI) were added to 100 g of N,N-dimethylacetamide (DMAc), and ultrasonic treatment was performed until N,N-dimethylacetamide (DMAc) became transparent, thus obtaining a dispersion solution of amorphous silica particles (dispersed concentration: 0.1 wt %). Thereafter, while passing nitrogen through a 1 L reactor with a stirrer, a nitrogen injector, a dropping funnel, a temperature controller and a condenser, the dispersion solution of silica particles and 100 g of the polyimide solid of Comparative Example 2-1 were added to 569 g of N,N-dimethylacetamide (DMAc) in the reactor and stirred, and the dissolved mixture (solid content of 13 wt %) was then treated as in Example 1, thereby manufacturing a polyimide film (thickness 60 μm).

Comparative Example 5

A polyimide film was manufactured in the same manner as in Example 1. Specifically, 0.1 g of layered silicate STN [$(C_8H_{17})_3(CH_3)N^+$] available from Co-op CHEMICAL JAPAN was added to 100 g of N,N-dimethylacetamide (DMAc), and ultrasonic treatment was performed until N,N-dimethylacetamide (DMAc) became transparent, thus obtaining a layered silicate dispersion solution (dispersed concentration: 0.1 wt %). Thereafter, while passing nitrogen through a 1 L reactor with a stirrer, a nitrogen injector, a dropping funnel, a temperature controller and a condenser, the layered silicate dispersion solution and 100 g of the polyimide solid of Comparative Example 2-1 were added to 569 g of N,N-dimethylacetamide (DMAc) in the reactor and stirred, and the dissolved mixture (solid content of 13 wt %) was then treated as in Example 1, thereby manufacturing a polyimide film (thickness 65 μm).

Comparative Example 6

6-1: Preparation of Polyimide

While passing nitrogen through a 1 L reactor with a stirrer, a nitrogen injector, a dropping funnel, a temperature controller and a condenser, 551 g of N,N-dimethylacetamide (DMAc) was placed in the reactor, and the temperature of the reactor was adjusted to 25° C., 64.046 g (0.2 mol) of TFDB was dissolved, and the resulting solution was maintained at 25° C. 29.422 g (0.1 mol) of BPDA was added, and stirred for 1 hr, so that BPDA was completely dissolved. As such, the temperature of the solution was maintained at 25° C. Further, 44.425 g (0.1 mol) of 6FDA was added, and the resulting mixture was stirred for 12 hr, thus obtaining a polyamic acid solution having a solid content of 20 wt %.

The polyamic acid solution was added with 19.98 g of pyridine and 25.76 g of acetic anhydride, stirred for 30 min, further stirred at 80° C. for 2 hr, cooled to room temperature, and precipitated with 20 L of methanol. The precipitated solid was filtered, ground, and dried at 80° C. in a vacuum for 6 hr, yielding 128 g of a polyimide solid in powder form.

6-2: Manufacture of Polyimide Film

While passing nitrogen through a 1 L reactor with a stirrer, a nitrogen injector, a dropping funnel, a temperature controller and a condenser, 100 g of the polyimide solid of Comparative Example 6-1 was dissolved in 669 g of N,N-dimethylacetamide (DMAc) in the reactor, thus obtaining a solution having a solid content of 13 wt %. The subsequent procedures were carried out in the same manner as in Example 1, thereby manufacturing a polyimide film (thickness 60 μm).

Evaluation of Properties (1) Transmittance

The transmittance of each of the films manufactured in the examples and comparative examples was measured at 550 nm using a UV spectrophotometer (CM-3700d, available from KONICA MINOLTA).

(2) Yellow Index (Y.I.)

The yellow index of each of the films manufactured in the examples and comparative examples was measured at 550 nm using a UV spectrophotometer (CM-3700d, available from KONICA MINOLTA) according to ASTM E313 standards.

(3) Coefficient of Thermal Expansion (CTE)

The coefficient of thermal expansion of each of the films manufactured in the examples and comparative examples was measured two times at 50~250° C. according to a TMA-Method using TMA (Diamond TMA, available from PERKIN ELMER), the heating rate was 10° C./min, and a load of 100 mN was applied. Because residual stress could be left behind in the thermally treated film, residual stress was completely removed at the first run, and the second value was represented as the actual measurement value.

(4) Thickness

The thickness of each of the films manufactured in the examples and comparative examples was measured using an anritsu electronic micrometer, and the deviation of the anritsu electronic micrometer was 0.5% or less.

(5) Haze

The haze of each of the films manufactured in the examples and comparative examples was measured at ten positions of each film having a size of 10 cm×10 cm by means of a D65 light source using a hazemeter (HM 150, available from MURAKAMI COLOR RESEARCH LABORATORY), and the values, except the maximum and minimum values, were averaged.

TABLE 1

|  | Thick. (μm) | Added amorphous silica particles (g) | Conc. Of amorphous silica particles dispersed in solvent (wt %) | Transmit. (%) | Y.I. | CTE (ppm/° C.) | Haze |
|---|---|---|---|---|---|---|---|
| Comp. Ex. 1 | 65 | — | — | 89.8 | 2.7 | 22 | 0.8 |
| Comp. Ex. 2 | 55 | 0.03 | 0.1 | 87.3 | 5.6 | 15.2 | 1.9 |
| Comp. Ex. 3 | 65 | 0.05 | 0.1 | 87.0 | 9.0 | 14.7 | 3.3 |
| Comp. Ex. 4 | 60 | 0.1 | 0.1 | 85.1 | 13.0 | 13.8 | 7.7 |
| Comp. Ex. 5 | 65 | 0.1 | 0.1 | 85.0 | 9.0 | 14.0 | 6.0 |
| Comp. Ex. 6 | 60 | — | — | 89.8 | 2.5 | 37.7 | 0.7 |
| Ex. 1 | 67 | 0.03 | 0.1 | 89.6 | 2.8 | 14.8 | 0.9 |
| Ex. 2 | 67 | 0.05 | 0.1 | 89.4 | 3.0 | 14.2 | 0.9 |
| Ex. 3 | 65 | 0.07 | 0.1 | 89.2 | 3.3 | 13.5 | 1.0 |
| Ex. 4 | 65 | 0.1 | 0.1 | 88.3 | 3.9 | 12.2 | 1.3 |
| Ex. 5 | 65 | 0.03 | 1.0 | 88.9 | 3.0 | 14.9 | 1.0 |
| Ex. 6 | 63 | 0.05 | 1.0 | 88.5 | 3.5 | 14.2 | 1.4 |
| Ex. 7 | 63 | 0.07 | 1.0 | 88.2 | 4.2 | 13.7 | 1.6 |
| Ex. 8 | 63 | 0.1 | 1.0 | 88.0 | 4.9 | 12.5 | 1.7 |

As is apparent from Table 1 showing the results of measurement of the properties of the polyimide films of Examples 1~8 and Comparative Examples 1~6, the polyimide film (Comparative Example 1) manufactured without the use of the silica particles had high CTE and thus exhibited poor heat resistance, and the polyimide films manufactured using the amorphous silica particles having no OH group thereon (Comparative Examples 2~4) or using layered silicate (Comparative Example 5) had high haze and yellow index and thus exhibited poor transparency.

In Comparative Example 6, the polyimide resulting from dianhydride and diamine, without the use of the aromatic dicarbonyl compound, had low haze and yellow index and thus manifested superior transparency, but had high CTE, undesirably resulting in poor heat resistance.

Consequently, the polyimide films (Examples 1~8), which were manufactured by mixing the polyimide resulting from copolymerizing the dianhydride, the aromatic dicarbonyl compound and the diamine with the appropriate amount of the silica particles having OH groups, exhibited transparency and superior heat resistance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polyimide, comprising amorphous silica particles having OH groups thereon,
wherein an amount of the amorphous silica particles is 0.01-0.1 parts by weight based on 100 parts by weight of the polyimide; and
wherein the polyimide is obtained by (a) providing a partially imidized polyimide resin solid; (b) mixing a dispersion of the amorphous silica and the partially imidized polyimide resin solid; and (c) subjecting the resulting mixture obtained in (b) to imidization, wherein the dispersion of the amorphous silica contains the amorphous silica in a concentration of 0.01-1.0 wt % in a solvent.

2. The polyimide of claim 1, wherein the partially imidized polyimide resin solid is prepared by copolymerizing a dianhydride, an aromatic dicarbonyl compound and a diamine.

3. A polyimide film, comprising the polyimide of claim 1, wherein the polyimide film has on optical transmittance of 88% or more at a wavelength of 550 nm.

4. The polyimide film of claim 3, which has a haze of 2.0 or less.

5. The polyimide film of claim 3, which has a coefficient of thermal expansion of 15 ppm/° C. or less at 50-250° C., and a yellow index of 7 or less.

6. The polyimide film of claim 3, wherein the polyimide film is obtained by polymerizing a dianhydride, an aromatic dicarbonyl compound and a diamine in a first solvent to prepare a polyamic acid solution, imidizing the polyamic acid solution to prepare an imidized solution, which is then added to a second solvent, filtered and dried to obtain a polyimide resin solid, mixing the polyimide resin solid with amorphous silica particles having OH groups thereon dispersed in the first solvent to prepare a mixture, and then subjecting the mixture to a film forming process.

7. The polyimide film of claim 6, wherein the polyimide film is obtained by performing additional thermal treatment at 300-500° C. for 1 min-3 hr, after the film forming process.

8. The polyimide film of claim 6, wherein the first solvent is at least one selected from the group consisting of m-cresol, N-methyl-2-pyrrolidone, dimethylformamide, dimethylacetamide, dimethylsulfoxide, acetone and diethylacetate, and the second solvent is at least one selected from among water, alcohols, ethers and ketones.

9. A substrate for a display, comprising the polyimide film of claim 3.

* * * * *